US007099348B1

(12) United States Patent
Warwick

(10) Patent No.: US 7,099,348 B1
(45) Date of Patent: Aug. 29, 2006

(54) DIGITAL AUDIO BROADCAST SYSTEM WITH LOCAL INFORMATION

(75) Inventor: Colin A. Warwick, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/184,744

(22) Filed: Nov. 3, 1998

(51) Int. Cl.
*H04B 7/212* (2006.01)

(52) U.S. Cl. ...................... 370/442; 348/423; 348/429; 370/342; 370/389; 370/471

(58) Field of Classification Search ................ 370/294, 370/312, 314, 316, 345, 432, 490, 317, 318, 370/319, 320, 321, 322, 326; 455/3.01, 3.02
See application file for complete search history.

(56) References Cited

U.S. PATENT DOCUMENTS

| | | | | |
|---|---|---|---|---|
| 4,365,110 | A * | 12/1982 | Lee et al. | 370/312 |
| 5,668,805 | A | 9/1997 | Yoshinobu | |
| 5,729,825 | A * | 3/1998 | Kostreski et al. | 725/62 |
| 5,757,792 | A * | 5/1998 | Aoki | 370/347 |
| 5,815,170 | A * | 9/1998 | Kimura et al. | 455/186.1 |
| 5,874,986 | A * | 2/1999 | Gibbon et al. | 725/134 |
| 5,875,396 | A * | 2/1999 | Stockton et al. | 434/276 |
| 5,898,680 | A * | 4/1999 | Johnstone et al. | 370/316 |
| 5,918,156 | A * | 6/1999 | Tanabe | 455/12.1 |
| 5,995,495 | A * | 11/1999 | Sampson | 370/316 |
| 6,040,867 | A * | 3/2000 | Bando et al. | 375/240.27 |
| 6,118,820 | A | 9/2000 | Reitmeier et al. | |
| 6,160,585 | A * | 12/2000 | Schmidt et al. | 348/423 |
| 6,260,195 | B1 * | 7/2001 | Takahashi | 725/136 |
| 6,460,086 | B1 * | 10/2002 | Swaminathan et al. | 709/236 |
| 6,539,166 | B1 * | 3/2003 | Kawamura et al. | 386/95 |
| 6,560,285 | B1 * | 5/2003 | Reitmeier et al. | 375/240.16 |

FOREIGN PATENT DOCUMENTS

| | | |
|---|---|---|
| EP | 0 580 976 | 2/1994 |
| JP | 3117123 | 5/1991 |
| JP | 5145434 | 6/1993 |
| JP | 06181460 | 6/1994 |

(Continued)

OTHER PUBLICATIONS

G. Fuchs, T. Schindhelm, H. Weissleder and B. Roshcer. "DAB Micro-Transmitters for Insertion of Local Windows," IEEE Transactions on Consumer Electronics, Aug. 1998, pp. 1154-1158.

(Continued)

*Primary Examiner*—Chi Pham
*Assistant Examiner*—Phuc Tran

(57) ABSTRACT

A digital audio broadcast channel is used in accordance with the principles of the present invention to broadcast local content information signals included with an associated geographically identifying code (e.g., a zip code) for reception only by those receivers associated with the geographically identifying code. Preferably, local content broadcasts containing audible information are preferably compressed for transmission to increase the capacity of the channel. A disclosed receiver monitors received signals for active local broadcasting relating to that particular locality, and switches to the reception of that local content information signal instead of the normal mode of reception of a general broadcast information signal for the duration of the local content information signal. Preferably, the unique local broadcast identifier code is contained in a header of the transmitted data packets. General broadcast content information and local content information can be received substantially simultaneously such that the audio signals relating to the general broadcast content and the local content are superimposed on one another, or reception of the local information may preempt reception of general broadcast information.

24 Claims, 6 Drawing Sheets

FOREIGN PATENT DOCUMENTS

| | | |
|---|---|---|
| JP | 10174068 | 6/1998 |
| WO | WO 96/02988 | 2/1996 |
| WO | WO 98/45965 | 10/1998 |

OTHER PUBLICATIONS

European Search Report, Apr. 16, 2003.

* cited by examiner

DIGITAL AUDIO BROADCAST SYSTEM WITH LOCAL INFORMATION

BACKGROUND OF THE INVENTION

1. Field of the Invention

This invention relates generally to digital audio broadcast systems. More particularly, it relates to the inclusion and transmission of local information for each of a plurality of localities within a channel of a larger scale broadcast transmission.

2. Background of Related Art

Various methods of broadcasting signals are known. For instance, a number of attempts have been made to simultaneously broadcast similar copies of the same source material on different frequencies or channels, e.g., both in digital form, and/or one in digital form and one in analog form. This technique can be advantageously employed for non-commercial broadcasts such as cellular phone transmissions, e.g., to provide for backward compatibility and/or signal redundancy, as well as for commercial broadcasts such as digital television (DTV) or radio services such as FM.

For instance, FIG. 5 depicts a conventional method of simultaneously broadcasting two digital copies of the same source material along with an older standard analog waveform. In the shown example, the broadcast includes two digital audio broadcast signals A and B and one analog broadcast signal C transmitted in the same band on the same channel, otherwise known in the United States as an In-Band On-Channel (IBOC) Digital Audio Broadcast (DAB) or hybrid IBOC.

In the disclosed example, the hybrid IBOC DAB signal 600 includes a center band containing a first, analog copy of the source material, an upper band A containing a first digital copy of the same source material, and a lower band B containing a second digital copy of the same source material.

The use of both an analog broadcast signal C and digital broadcast signals A, B improves system reliability and/or backward compatibility by allowing the capability for both analog and digital receivers to receive and interpret at least one copy of the source material. In many cases, this provides backwards compatibility to analog systems as systems are replaced with more advanced digital counterpart systems. While FIG. 5 shows a single channel containing DAB information, FIG. 6 shows that both digital broadcast signals A and B (as well as analog broadcast signal C) are typically transmitted at the same time.

Many homes, offices and automobiles currently receive digital audio broadcast (DAB) information, which is broadcast by transmission to many receivers spread over a wide geographic region. Present terrestrial digital audio broadcast systems allow coverage over a finite distance from a broadcast transmitter, e.g., typically 10 to 70 miles from the broadcast transmitter. Thus, many broadcast transmitters are required to cover a large geographic area. In such systems, if the receiver is mobile, e.g., an automobile radio, the received signal will eventually fade out as the mobile receiver moves farther from the antenna of the broadcast transmitter, requiring the receiving party to retune their receiver to the broadcast frequency of another transmitter.

Such disadvantages can be overcome with the use of a wide area transmitter, e.g., a transponder located in a satellite in orbit around the earth. In this way, one or more satellites are able to provide fairly continuous coverage over a large scale area, e.g., over an entire nation. Similarly, another technique for transmitting digital audio broadcast information utilizes wired cable found in most homes can also overcome disadvantages of terrestrial radio frequency (RF) broadcasts. However, some disadvantages still remain and new disadvantages are caused in both satellite and cable digital audio broadcast systems.

For instance, there are often times in a digital audio broadcast system wherein it would be desirable or important to transmit local information relevant to persons in a particular locality. For instance, information such as local news, weather and/or traffic reports may be particularly relevant to persons in some localities and irrelevant and a even a nuisance if received by persons in other localities. Localized terrestrial wireless systems were able to accommodate this need to a certain extent because of the relatively small service area for any one transmitter. However, with the emergence and prevalence of satellite systems and cable systems, any one channel is broadcast throughout a very large geographic region containing a large number of localities.

FIG. 7A shows a conventional DAB transmitter for transmitting both local audio content and general broadcast audio content using separate channels of a transmission medium.

In particular, a signal based on the program content from a local audio content source 210 is provided to a first channel of a transmitter 814. The audio content is digitized if in analog form, and packetized and otherwise formatted for transmission by a module which packetizes and constructs header information 812, which is under the control of a controller 820. The formatting performed by the packetizer and header information module 812 includes functions of any appropriate protocol, e.g., a broadcast protocol such as simple time division multiplex framing protocols, or an unacknowledged UDP protocol commonly used for streaming media applications, to allow for proper transmission of program content signals to appropriate receivers in the broadcast area.

To transmit both general broadcast information and local broadcast information, the conventional DAB transmitter 814 utilizes separate channels. Thus, information from a general audio content source 800 is transmitted in a second channel of the transmitter 804. A packetizer and header information module 802 with respect to the general broadcast information properly formats that information for general broadcast to all receivers tuned to the general broadcast frequency. Unfortunately, in conventional systems, to receive a local content information source a receiver must tune to another channel dedicated throughout the general broadcast area to the transmission of local content information relevant only to a particular locality.

FIG. 7B shows a conventional DAB receiver for receiving either the local audio content or general broadcast audio content transmitted by the conventional DAB transmitter shown in FIG. 7A.

In FIG. 7B, the receiver is capable of tuning or selecting content information from either the general broadcast channel of a receiver 702 or from a local broadcast channel of the receiver 704. This tunability is functionally depicted as a switch 711 and controlled by a controller 706. The user of the receiver can inform the controller 706 as to which channel is desired, i.e., the general broadcast channel of the receiver 702 or any one of a large plurality of local broadcast channels of the receiver 704. The selected broadcast content information is properly assembled and prepared for playback in analog form by a broadcast information digital-to-analog converter 708, appropriately amplified by an audio player 710, and output on a speaker 712.

Unfortunately, in conventional DAB systems, the provision of both general broadcast information and local information for each of a large number of localities requires separate channels for each, i.e., a separate channel for each stream of local content information. This dedicated use of additional digital audio broadcast channels for the transmission of local information to all receivers, whether or not the receiver is in the locality to which the information pertains, is wasteful of bandwidth throughout the general broadcast area. Moreover, the provision of local information relevant to other localities as well as the one that the receiver is in may confuse a user outside of the intended locality. For instance, if a tornado warning is issued on a local weather broadcast intended only for a particular locality, but a receiver in another locality tunes into the dedicated channel carrying the local content information regarding the tornado, the user may not understand that the warning does not apply to their viewing or listening (i.e., reception) area.

There is thus a need for a digital audio broadcast method and apparatus which allows transmission of information relevant to particular locations without wasting valuable channels, and without the potential for causing confusion to users receiving local information intended for access by receivers in another locality.

SUMMARY OF THE INVENTION

In accordance with the principles of the present invention, a system for transmitting a plurality of localized information streams within a common general digital audio broadcast channel comprises a plurality of local content source information streams. A plurality of local broadcast identifying codes are each associated with a respective one of the plurality of local content source information streams. A formatting module is adapted to insert the plurality of local broadcast identifying codes into respective ones of the plurality of local content source information streams. A transmitter is adapted to transmit data packets each containing at least one of the plurality of local broadcast identifying codes and a portion of one of the plurality of local content source information streams.

In accordance with another aspect, an information stream combiner for a digital audio broadcast transmitter comprises a local audio content source, a module adapted to packetize the local audio content source, a local broadcast identifying code storage element, and a processor adapted to insert a local identifying code obtained from the local broadcast identifying code storage element into each data packet containing a portion of the local audio content source.

A method for transmitting a plurality of local broadcast information streams within a common channel in accordance with the principles of the present invention comprises associating one of a plurality of unique local broadcast identifying codes with each of a plurality of local content information streams, and transmitting over the common channel a plurality of data packets each containing one of the plurality of content information streams and an associated one of the plurality of unique local broadcast identifying codes.

A method of receiving one of a plurality of local audio content source information streams in a common channel of a digital audio broadcast system in accordance with another aspect of the present invention comprises monitoring the common channel for a local audio transmission associated with a geographic location of a receiver, and playing back the local audio content source information stream if a monitored local audio transmission is associated with the geographic location of the receiver.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
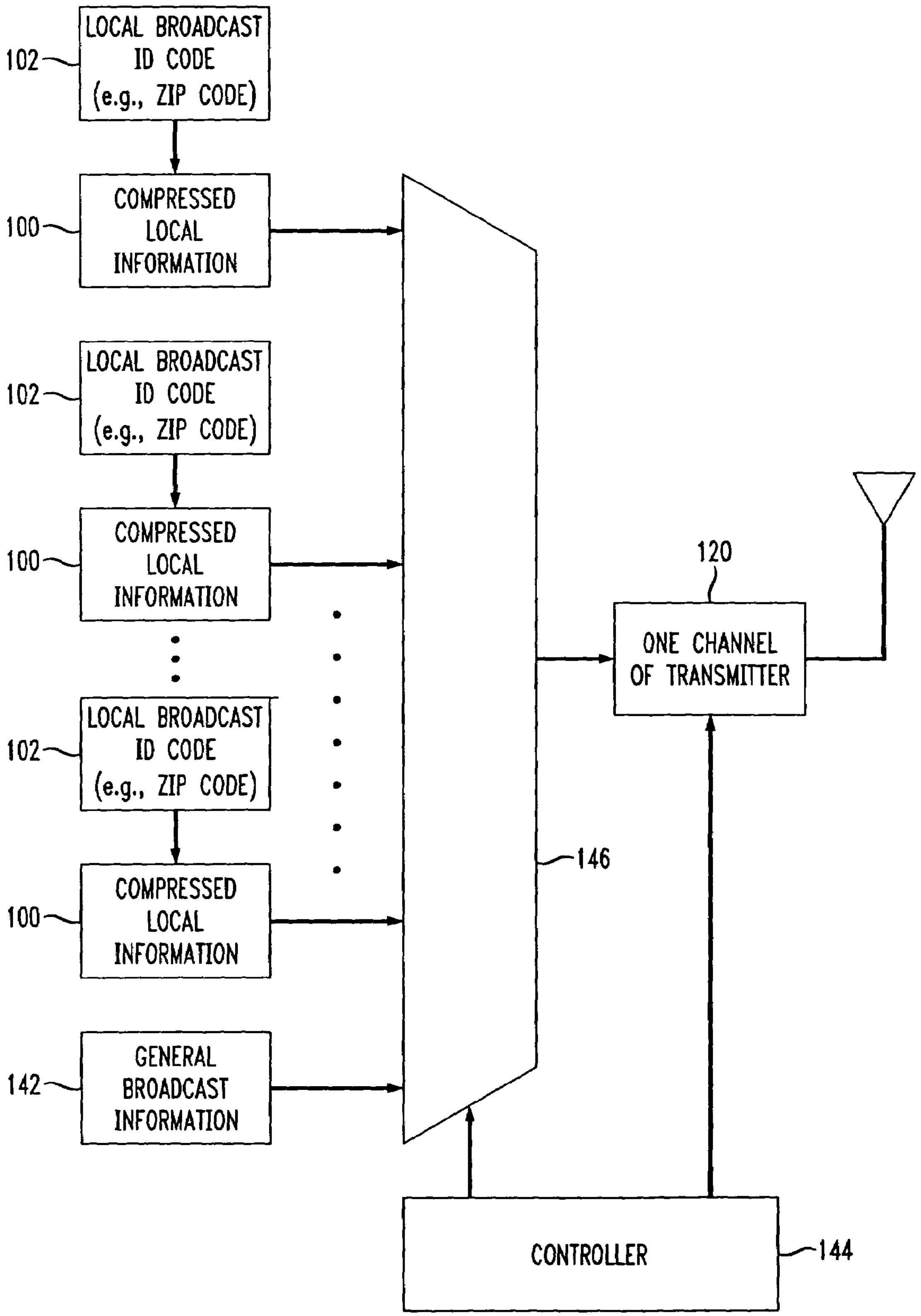
FIG. 1 shows a generalization of the combination of a plurality of local content information data streams into a channel of a transmitter, in accordance with the principles of the present invention.

A digital audio broadcast channel is used in accordance with the principles of the present invention to broadcast local content information signals to the entire general broadcast area but for reception only by those receivers associated with a designated local identifier. Thus, e.g., one radio channel may contain the local content information for many different localities. Depending upon the locality associated with a particular radio receiver, the radio receiver tuned to the one radio channel will receive and play only the local content information associated with that particular locality. In a preferred embodiment, local content information for localities not associated with a particular radio receiver will be essentially ignored, i.e., not accepted for processing by the digital audio broadcast radio receiver.

The present invention provides a method and apparatus for transmitting local information to each of a plurality, e.g., up to tens of thousands of specific localities within a general broadcast area (given the United States' 5 digit zip code), using only one or only a few channels of a transmitter. Greater numbers of specific localities can be based on more detailed information, e.g., the nine-digit zip codes now in many areas of the United States.

In the disclosed embodiment, the local information (e.g., local news, weather, or other area specific information within a large scale, e.g., national digital broadcast system) is transmitted together with geographically identifying information (e.g., a zip code), for reception only by receivers associated with that geographically identifying information.

In a preferred embodiment, each burst or data packet containing local information within a general broadcast channel will contain a header or other identifying information specific to a particular locality, e.g., a postal or zip code, appropriate for reception by any one or more of the plurality (e.g., hundreds) of subdivisions of the large scale area covered. In response, the receivers in the general broadcast area of the digital audio broadcast will receive and inspect the header of each data packet, and retain only those packets intended for that receiver based on its match to a designated geographic area or locality.

For example, a receiver can be customized by a user to include a geographically identifying code, e.g., the zip code of the locality in which it is used. Then, the receiver will monitor the information received from a digital audio broadcast and play only those broadcasts which are intended for the large scale area and/or those broadcasts which include an appropriate local broadcast identifier code associated with the locality in which the receiver is installed.

The local information may be textual (e.g., in ASCII or UNICODE format) intended for display at a receiver, or may contain the basis for an audible signal (e.g., spoken words or music), or both.

Textual information, when received by a receiver associated with the intended locality, will be appropriately displayed based on the particular application. Local content broadcasts containing audible information are preferably compressed for transmission to increase the capacity of the channel. for instance, the audible local content may be digitized and compressed using a low bit rate speech coder, e.g., a linear predictive coder (LPC), code excited linear predictive (CELP) coder, adaptive differential pulse code modulation (ADPCM), or the like. An appropriate encoded bit rate of the transmitted signal might be, e.g., 1200 bits per second (bps). Nevertheless, the principles of the present invention relate equally to any type encoding of the local content information signal, or even to no encoding of a local signal at all. The present invention also relates to a transmitted signal and/or data bit rate having any bit rate.

The disclosed embodiments relate to a method and apparatus for transmitting a plurality of local content information streams into one DAB channel. However, the present invention also relates to the transmission of local content information together with a general broadcast information signal. Thus, for instance, a weather emergency can be transmitted to one particular locality within a general broadcast audience without interrupting the reception of the general broadcast information signal by receivers not in that locality.

It is preferable for the receivers in accordance with the principles of the present invention to monitor received signals for active local broadcasting relating to that particular locality, and to switch to the reception of that local content information signal instead of the normal mode of reception of a general broadcast information signal for the duration of the local content information signal.

FIG. 1 shows a generalization of the combination of a plurality of local content information data streams in accordance with the principles of the present invention.

In particular, a general broadcast information signal 142 is provided to one channel of a transmitter 120 for transmission to a plurality of receivers in a general broadcast region. The transmission may be by terrestrial RF, satellite wireless, and/or wired means. The inclusion of the general broadcast information signal 142 is optional. What is important in accordance with the principles of the present invention is that a plurality of local content information signals be transmitted in a common channel of the transmitter 120.

As shown in FIG. 1, a plurality of local content information is digitized and compressed and provided to a multiplexing function 146. The multiplexing function 146 is preferably controlled by a controller 144. The multiplexing function 146 is shown in FIG. 1 as a multiplexer, but may be any device capable of combining data packet transmissions from each of the plurality of local content information sources 100 for submission to a common channel of a transmitter.

Importantly, each of the local content information streams 100 are associated with a unique local broadcast identifier code 102. The unique local broadcast identifier code 102 is preferably an alphanumeric ID associated with a particular geographic region, e.g., one or more zip codes. More than one zip code may be applicable in a mobile environment, e.g., those zip codes crossed during a commute to or from work. Preferably, the unique local broadcast identifier code 102 is contained in a header of the transmitted data packets.

Figure 2:
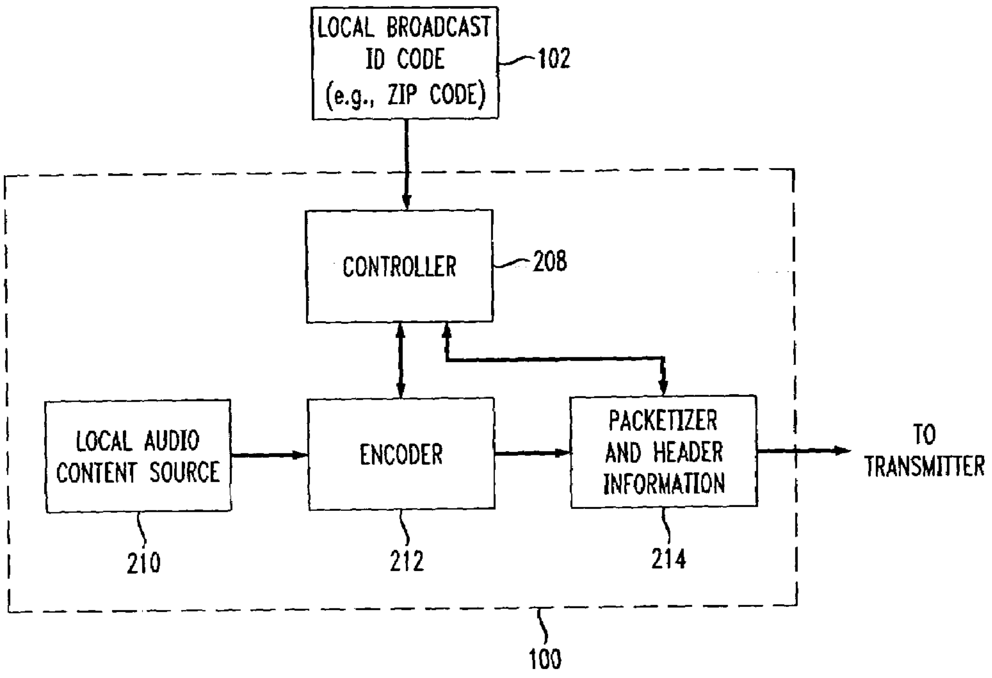
FIG. 2 is a more detailed block diagram of a local content information sources having audio-based information shown in FIG. 1.

FIG. 2 is a more detailed block diagram of a local content information source 100 having audio-based information.

In particular, the local content information sources 100 include a series combination of a digitized local audio content source 210, an encoder 212, and a module adapted to packetize the data stream together with a local broadcast identifier code 102, e.g., a zip code. The local broadcast identifier 102 is stored in an appropriate location in the receiver, e.g., in non-volatile memory accessible by a controller 208, e.g., Flash or EEPROM memory. In the disclosed embodiment, the encoder 212 and the packetizer and header information module 214 are controlled by the controller 208.

The local audio content source 210 may include any digitized data stream particularly relevant to a subset of receivers in a particular locality. For instance, news and weather may be particularly focused on each of a plurality of localities, and intended for broadcast only to those receivers associated with that particular locality.

Figure 3:
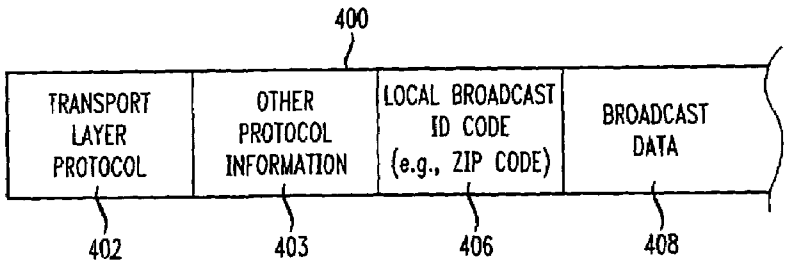
FIG. 3 shows the relevant portion of an exemplary packet header including a local broadcast identifier, in accordance with the principles of the present invention.

FIG. 3 shows the relevant portion of an exemplary packet header including a local broadcast identifier in accordance with the principles of the present invention.

In particular, although it is recognized that the header of a data packet varies greatly from application to application, the present invention relates to the inclusion of a local broadcast identifier code 406, e.g., a zip code relevant to the intended receivers, together with the broadcast data 408 corresponding to the digitized (and possibly compressed) local content information. Other portions of the data packet header 400 are conventional, and may include, e.g., information relevant to a transport layer protocol 402 and/or other protocol information (e.g., IP, TCP/IP, ATM, etc.).

The local broadcast identifier code 406 may be anything which can be used to identify a particular geographic subset of the general population receiving the transmitted broadcast signals. For instance, in the disclosed embodiment, the local broadcast identifier code 406 is a postal code or zip code of the appropriate area. Of course, the invention relates equally to the transmission of local DAB information to geographic locations smaller or larger than those defined by a particular postal or zip code.

Figure 4:
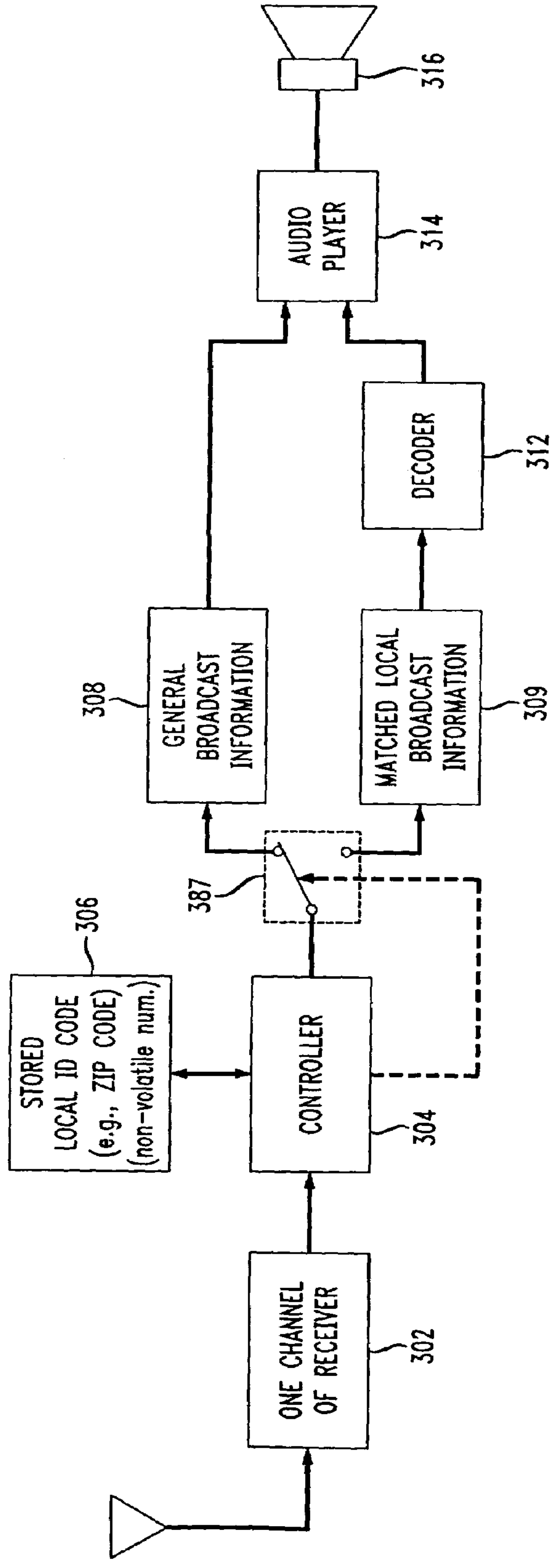
FIG. 4 shows an embodiment of a receiver for receiving local content information from a transmitter shown in FIGS. 1 to 3, in accordance with the principles of the present invention.
Figure 5:
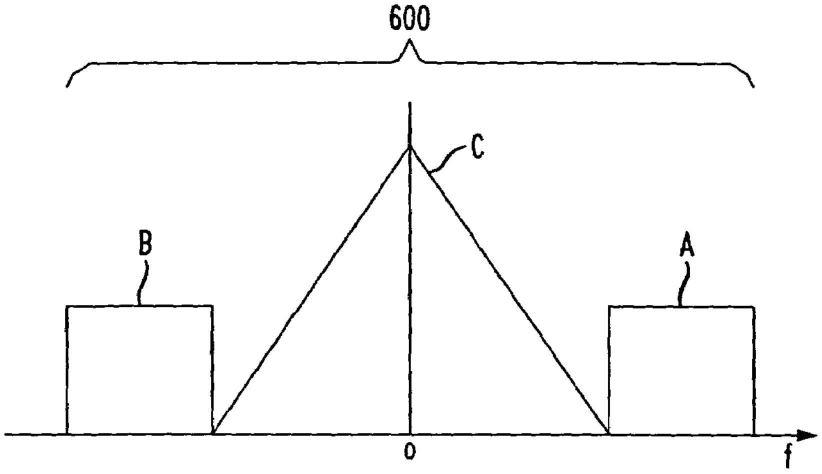
FIG. 5 PRIOR ART
FIG. 5 shows a conventional composite signal containing analog and digital signals in the frequency domain.
Figure 6:
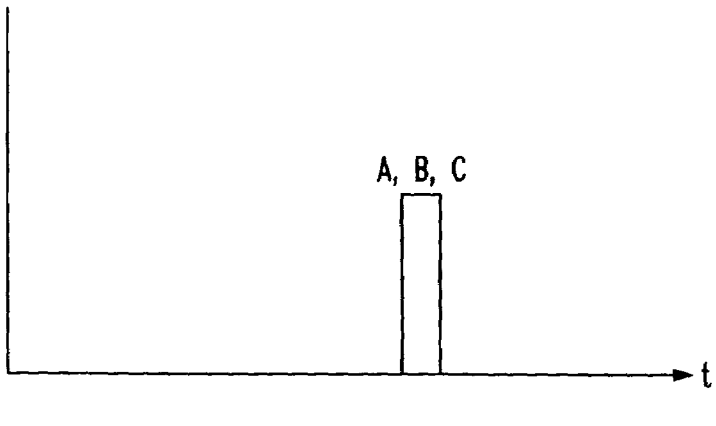
FIG. 6 PRIOR ART
FIG. 6 shows a representation of conventional broadcasts including at least two copies of the same source material.
Figure 7A:
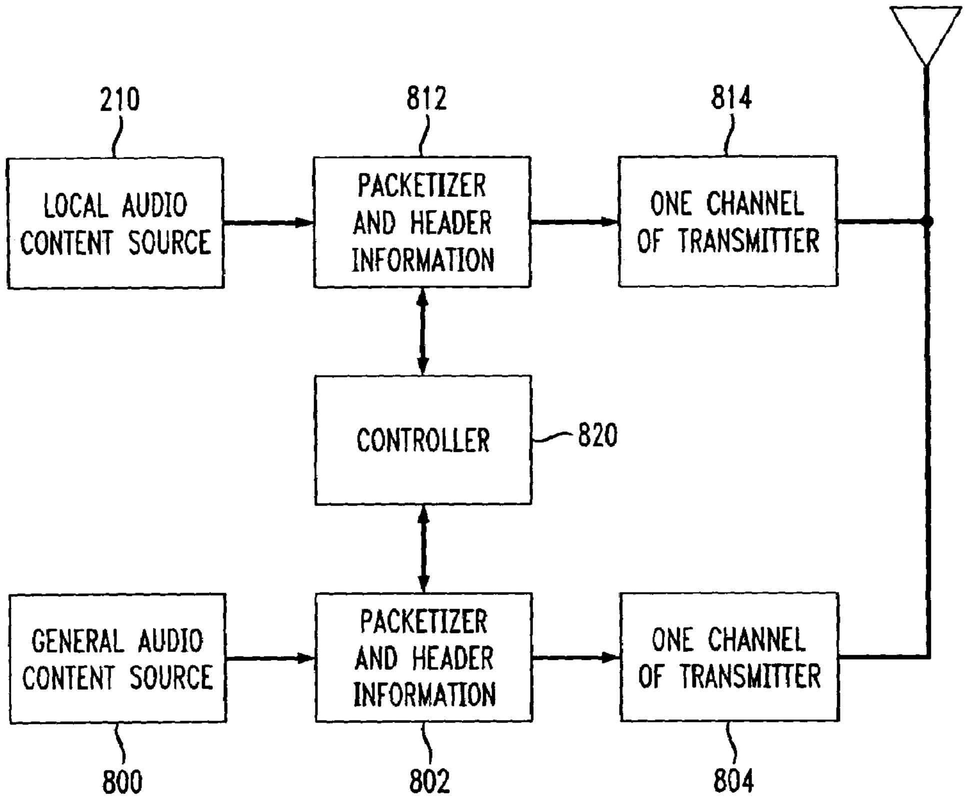
FIG. 7A PRIOR ART
FIG. 7A shows a conventional DAB transmitter for transmitting both local audio content information and general broadcast audio content information using separate channels of a transmitter.
Figure 7B:
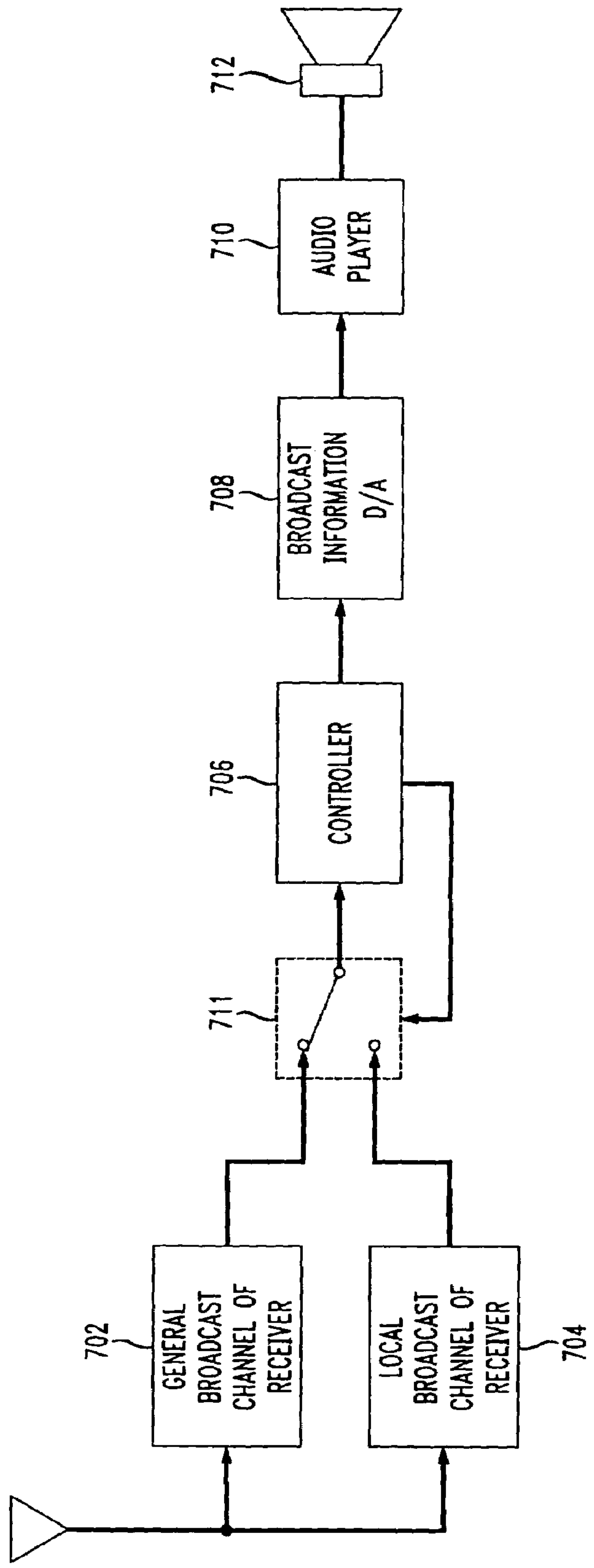
FIG. 7B PRIOR ART
FIG. 7B shows a conventional DAB receiver for receiving local audio content information or general broadcast audio content information transmitted by the conventional DAB transmitter shown in FIG. 7A.

FIG. 4 shows an embodiment of a receiver for receiving local content information from a transmitter shown in FIGS. 1 to 3, in accordance with the principles of the present invention.

In particular, the receiver shown in FIG. 4 is shown tuned to one channel of a receiver 302. It is to be understood that while the embodiments of the present invention describe broadcasts transmitted in one channel of a transmitter and received in one channel of a receiver, the transmitter and/or receiver may be and typically are capable of transmission and reception of content information broadcast in any of a plurality of channels.

When receiving general broadcast information in the one channel of the receiver 302, a controller 304 causes the acceptance of the data packets associated therewith based on the local broadcast identifier code 406 and provides the same to a module to process the general broadcast information 308. The module to process the general broadcast information 308 performs, e.g., a digital-to-analog conversion and any other process necessary to reconstruct the audio signal from the general broadcast source.

The controller 304 inspects the appropriate portion of a header of each data packet detected in the one channel of the receiver 302 and accepts only those packets either not specifically identified at all (i.e., associated with a general broadcast content information signal) or identified with a particular locality associated with the accepting receiver. General broadcast information data packets are provided to the module to process the general broadcast information 308. If however, the received data packet includes a particular local broadcast identifier code which matches a local identifier code 406 pre-stored in that receiver, then the received data packet is provided to a module to appropriately process the matched local broadcast information 309, e.g., to display the local information if it is textual, or decode the local information if it is compressed. If the audio information is encoded or otherwise compressed for transmission, the receiver preferably includes a complementary decoder 312 for reconstructing the local content information signal into an analog waveform for playback by an appropriate audio player 314 (e.g., amplifier) and speaker 316.

The local identifier code 406 stored in the storage area for the local identifier code 306 (FIG. 4) of the receiver is preferably input by the user or selected from among a preset plurality of choices upon installation, e.g., in a home or office. Alternatively, if the receiver is "addressable" (i.e., if the receiver contains an electronic serial number (ESN) and the broadcast system operates with a capability similar to a paging system) the service provider can offer to send a programming signal on that particular paging channel on behalf of a particular subscriber, based on information provided by the subscriber. For instance, their receiver ESN and home address.

Accordingly, although tuned to a common channel, receivers throughout the general broadcast area can retrieve different local content information by accepting only those packets that are deemed to be of interest to the listener, i.e., to be relevant to the particular locality of the user based on a match to the local broadcast identifier code 406.

If the accepted packet is in textual format, the receiver may make any appropriate use of the information, e.g., display the information on an appropriate display or vocalize the information using a conventional text-to-speech algorithm in the module to process matched local broadcast information 309 for playback by the audio player 314 and the speaker 316.

In one embodiment, the controller 304 in the receiver is capable of activating a switching function 387 to cause reception and appropriate decoding of a local content information signal when local content information activity is detected in the channel by the controller 304. In this way, the local information can be allowed to preempt the general broadcast information for, e.g., the duration of the local broadcast information.

In another embodiment, instead of the switching function 387, general broadcast content information and local content information can be received substantially simultaneously such that the audio signals relating to the general broadcast content and the local content are superimposed on one another. In such a case it may be desirable to increase the amplification of the local content information signal to provide an emphasis on the local information content to the listener.

While the disclosed embodiments relate to the immediate presentation of local content broadcast information upon receipt of the same by the receiver, the principles of the present invention relate equally to a receiver which stores the received local content broadcast information for playback on demand, optionally alerting the user (e.g., by flashing a light and/or emitting a beep) that such new information has arrived into the storage area, and awaits playback at the user's convenience.

Each controller shown with respect to the present invention may be any suitable and appropriate processor based on the particular application, e.g., any microprocessor, microcontroller, or digital signal processor (DSP).

In accordance with the principles of the present invention, the reception of local information can be controlled based on distinct political boundaries, e.g., state lines, county lines, etc., thus avoiding any confusion which might arise from the reception of a local information broadcast intended for another locality.

While the invention has been described with reference to the exemplary embodiments thereof, those skilled in the art will be able to make various modifications to the described embodiments of the invention without departing from the true spirit and scope of the invention.

What is claimed is:

1. A system for transmitting a plurality of localized information streams within a single general digital audio broadcast channel, comprising:

at least one local audio content source to provide a plurality of local content source information streams associated with a plurality of local broadcast identifying codes, each of said plurality of local broadcast identifying codes each relating to a local geographic area within a general broadcast area serviced by said system;

a formatting module to insert said plurality of local broadcast identifying codes into respective ones of said plurality of local content source information streams; and a digital radio transmitter to transmit data packets each containing at least one of said plurality of local broadcast identifying codes and at least a portion of one of said plurality of local content source information streams;

wherein at least one of said plurality of local broadcast identifying codes is contained in a header of each data packet transmitted by said transmitter.

2. The system for transmitting a plurality of localized information streams within a single general digital audio broadcast channel according to claim 1, wherein:

said transmitter transmits said data packets in a time division multiplex scheme.

3. The system for transmitting a plurality of localized information streams within a common general digital audio broadcast channel according to claim 1, wherein:

said plurality of local broadcast identifying codes each relate to a local geographic area within a general broadcast area serviced by said system.

4. The system for transmitting a plurality of localized information streams within a single general digital audio broadcast channel according to claim 1, wherein:

said plurality of local broadcast identifying codes each relate to a postal code.

5. The system for transmitting a plurality of localized information streams within a single general digital audio broadcast channel according to claim 1, wherein:

said plurality of local broadcast identifying codes each relate to a zip code.

6. The system for transmitting a plurality of localized information streams within a single general digital audio broadcast channel according to claim 1, wherein:

said system for transmitting is included within a satellite broadcast system.

7. The system for transmitting a plurality of localized information streams within a single general digital audio broadcast channel according to claim 1, wherein:

said system for transmitting is included within a wired cable broadcast system.

8. A method for transmitting a plurality of local broadcast information streams within a single channel, comprising:

associating at least one of a plurality of unique local broadcast identifying codes with each of a plurality of local content information streams, each of said unique local broadcast identifying codes being associated with a local geographic area within a general broadcast area; and transmitting a digital radio signal over said single channel, said digital radio signal comprising a plurality of data packets each containing one of said plurality of content information streams and an associated one of said plurality of unique local broadcast identifying codes;

wherein at least one of said plurality of unique local broadcast identifying codes are included in respective header portions of said data packets.

9. The method for transmitting a plurality of local broadcast information streams within a single channel according to claim 8, wherein:

said local content information streams are each a digital audio broadcast information stream.

10. The method for transmitting a plurality of local broadcast information streams within a single channel according to claim 8, wherein:

said general broadcast area is nationwide.

11. The method for transmitting a plurality of local broadcast information streams within a single channel according to claim 8, further comprising:

formatting data packets for each of said plurality of local content information streams.

12. The method for transmitting a plurality of local broadcast information streams within a single channel according to claim 8, wherein:

said common channel is a digital audio broadcast channel.

13. Apparatus for transmitting a plurality of local broadcast information streams within a single channel, comprising:

means for associating at least one of a plurality of unique local broadcast identifying codes with each of a plurality of local content information streams, said means for associating associates each of said unique local broadcast identifying codes with a local geographic area within a general broadcast area; and means for transmitting a digital radio signal over said single channel, said digital radio signal comprising a plurality of data packets each containing one of said plurality of content information streams and an associated one of said plurality of unique local broadcast identifying codes;

wherein said means for transmitting includes means for including at least one of said plurality of unique local broadcast identifying codes in respective header portions of said data packets.

14. The apparatus for transmitting a plurality of local broadcast information streams within a single channel according to claim 13, wherein:

said local content information streams are each a digital audio broadcast information stream.

15. The apparatus for transmitting a plurality of local broadcast information streams within a single channel according to claim 13, wherein:

said general broadcast area is nationwide.

16. The apparatus for transmitting a plurality of local broadcast information streams within a single channel according to claim 13, further comprising:

means for formatting data packets for each of said plurality of local content information streams.

17. The apparatus for transmitting a plurality of local broadcast information streams within a single channel according to claim 13, wherein:

said common channel is a digital audio broadcast channel.

18. An information stream combiner for a single channel of a digital audio broadcast transmitter, comprising:

a local audio content source;

a module to packetize said local audio content source;

a local broadcast identifying code storage element; and a processor to insert a local identifying code relating to a local geographic area within a general broadcast area, said local identifying code being obtained from said local broadcast identifying code storage element into each data packet containing at least a portion of said local audio content source;

wherein said processor is further to insert said local identifying code into a header portion of each data packet.

19. The information stream combiner for a single channel of a digital audio broadcast transmitter according to claim 18, wherein:

said local identifying code is a zip code.

20. The information stream combiner for a single channel of a digital audio broadcast transmitter according to claim 18, further comprising:

an audio encoder to compress a transmitted data rate with respect to said local audio content source.

21. A method of receiving one of a plurality of local audio content source information streams in a single channel of a digital audio broadcast system, comprising:

monitoring said single channel for a local audio transmission associated with a geographic location of a receiver;

playing back said local audio content source information stream if a monitored local audio transmission is associated with said geographic location of said receiver;

storing a unique local broadcast identifying code associated with said geographic location of said receiver;

said monitoring including a search of each detected data packet for said unique local broadcast identifying code contained therein corresponding to a transmission associated with said geographic location of said receiver.

22. The method of receiving one of a plurality of local audio content source information streams in a single channel of a digital audio broadcast system according to claim 21, wherein:

said unique local broadcast identifying code is a zip code.

23. The method of receiving one of a plurality of local audio content source information streams in a single channel of a digital audio broadcast system according to claim 21, further comprising:

preempting reception of a general broadcast during reception of transmissions relating to said geographic location of said receiver.

24. The method of receiving one of a plurality of local audio content source information streams in a single channel of a digital audio broadcast system according to claim 21, further comprising:

superimposing transmissions associated with said geographic location of said receiver with transmissions relating to a general broadcast.

* * * * *